Oct. 4, 1960 — W. O. VEDDER — 2,954,968
FLUID BARRIER
Filed Oct. 11, 1956 — 2 Sheets-Sheet 1
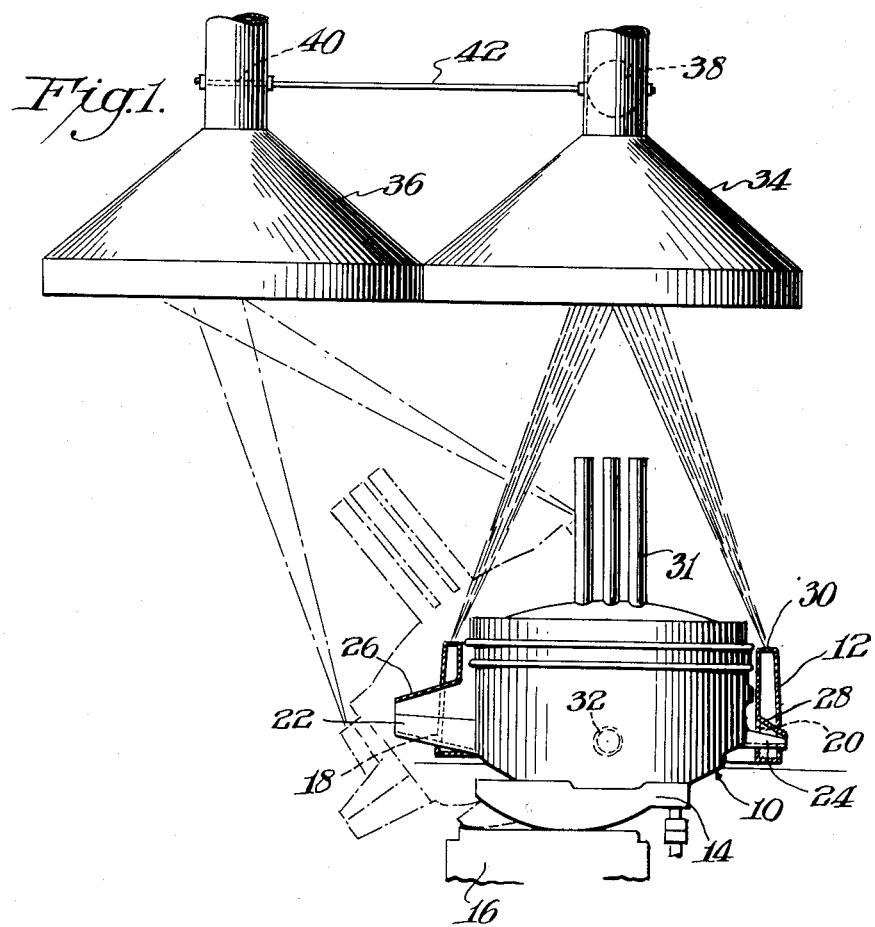
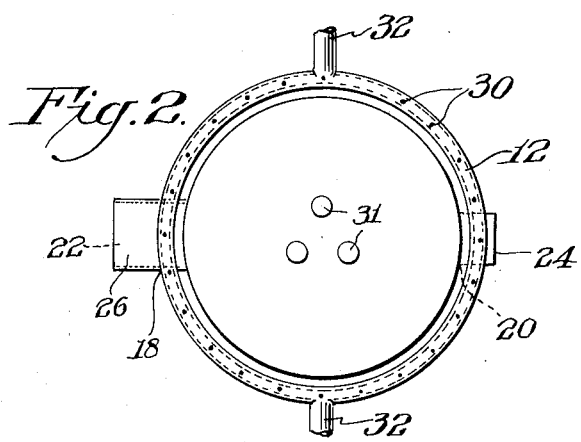
INVENTOR.
WALTER O. VEDDER
BY Connolly and Hutz
ATTORNEYS

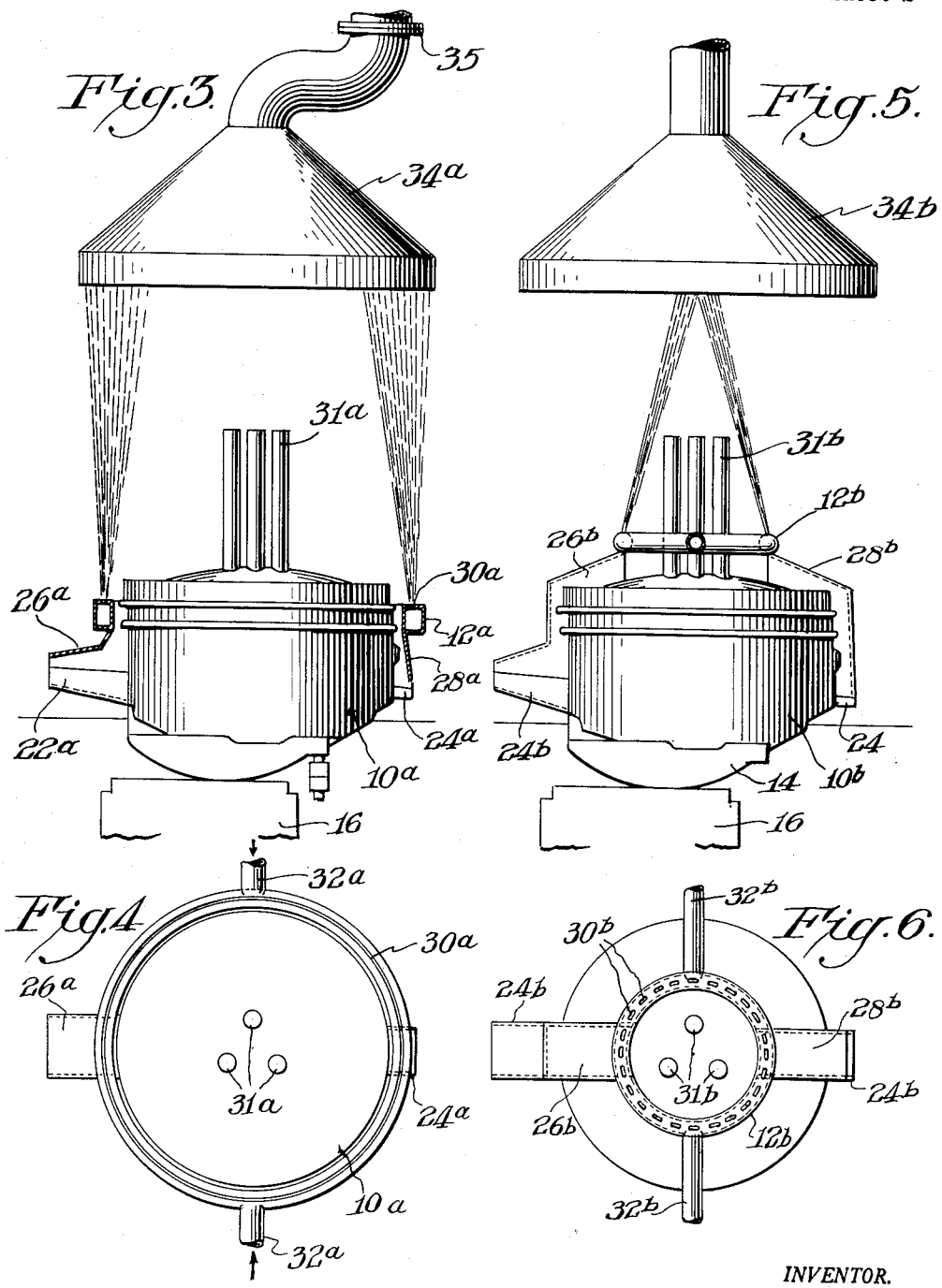

United States Patent Office 2,954,968
Patented Oct. 4, 1960

2,954,968
FLUID BARRIER

Walter O. Vedder, Hagerstown, Md., assignor to Pangborn Corporation, Hagerstown, Md., a corporation of Maryland Filed Oct. 11, 1956, Ser. No. 615,347

5 Claims. (Cl. 263—50)

This invention relates to a device for isolating the atmosphere within a concentrated space, and more particularly relates to a device for isolating the space surrounding a unit which contaminates or heats the ambient atmosphere.

The control of the atmosphere within a large enclosure such as a material-processing plant is complicated by the extremely large volume of air encompassed by the enclosure which is subject to contamination and heating by units such as furnaces or other processing equipment which emit large quantities of heat, fumes and dust. Air circulating or cleaning equipment for maintaining the air within this large enclosure free of heat, fumes and dust to allow workmen to operate under safe and healthful conditions would be prohibitive in size because of the large quantities of air through which the heat, fumes and dust are dispersed.

Small enclosures might be built to surround each offending unit, but these enclosures would involve considerable expense and would interfere with free access to the unit for normal operation and maintenance.

An object of the present invention, accordingly, is to provide a simple, convenient and economical device for preventing overheating and contamination of the atmosphere surrounding a unit which discharges heat or contaminating matter under normal operating conditions.

Another object of the present invention is to provide a simple, convenient and economical device for preventing dispersion of heat, fumes and dust from a furnace into the ambient atmosphere.

A further object of the present invention is to provide a device, as aforementioned, for preventing overheating of the atmosphere and dispersion of fumes and dust from a material-processing furnace such as an electric furnace which moves through a number of positions during its normal cycle of operation.

Other objects and many of the attendant advantages of this invention will be readily appreciated as the same become better understood by reference to the following detailed description when considered in connection with the accompanying drawings wherein:

Fig. 1 is a schematic view in elevation, partially in cross-section, of an embodiment of this invention;

Fig. 2 is a top plan view of the furnace and fluid curtain-forming assembly;

Fig. 3 is a view partly in elevation and partly in cross-section, of another embodiment of this invention;

Fig. 4 is a top plan view of the furnace and fluid curtain-forming assembly of Fig. 3;

Fig. 5 is a view partly in elevation and partly in cross-section, of another embodiment of this invention; and Fig. 6 is a top plan view of the furnace and fluid curtain-forming assembly of Fig. 5.

In accordance with this invention, a device for controlling, confining and collecting heat, fumes and dust emanating within a concentrated space includes a fluid distributing means which surrounds this concentrated area. Discharge means, operatively associated with this distributing means, provides a fluid curtain completely surrounding this space. Fluid supply means are connected to this distributing means for providing a flow of air or other gas through this discharge means of sufficient velocity to enable this fluid curtain to isolate the concentrated space from the ambient atmosphere.

A fluid suction means, which is positioned in the path of this curtain, entraps the fluid and entrained heat, fumes and dust within the curtain. This fluid forming the curtain, is projected at a sufficient velocity to prevent dispersion of the heat, fumes and dust into the ambient atmosphere, even in the presence of normal winds, drafts or thermal currents. The heat, fumes and dust laden air, trapped within this curtain, is accordingly entrained and directed into the air suction means. This contaminated air may be run through a dust collecting means or discharged to the outside atmosphere.

The apparatus for forming the fluid curtain comprises relatively simple components and is accordingly extremely economical to fabricate and assemble.

Referring now in greater detail to the drawings wherein similar reference characters refer to similar parts, Figs. 1 and 2 show an electric furnace 10 surrounded by a fluid distributing manifold 12. Manifold 12 is attached to the body of furnace 10 so that it may move with the furnace when it is tilted for pouring as shown in phantom outline Fig. 1. The entire furnace is tilted on its curved base 14 which rests on a pedestal 16. The tilting provisions are not described in detail since these details may be found in conventional electric furnaces. Apertures 18 and 20 are provided in manifold 12 through which pouring spout 22 and slag spout 24 extend respectively. Covers 26 and 28 respectively cover pouring spout 22 and slag spout 24 to direct their fumes within the periphery of manifold 12.

A fluid discharge means is provided at the upper portion of manifold 12. This discharge means is illustrated as comprising a series of spaced orifices 30 in the top wall of the manifold. However, in many instances, it may be more desirable to substitute a series of upwardly projecting nozzles for such orifices in order to better control the direction of the fluid jets forming the fluid curtain. Where desired, furthermore, it is within the scope of the invention to provide a plurality of such annular series of orifices or nozzles in order to obtain a denser fluid curtain.

Orifices or, as they may more truly be termed, nozzles 30, are defined by inwardly-inclined walls in order to direct the curtain and entrained fumes and dust into a concentrated area to facilitate their collection and removal. This angular curtain clears the top of the furnace 10 and encompasses electrodes 31 on the roof of furnace 10.

A supply of fluid is conducted to manifold 12 by piping 32 connected, for example, at diametrically opposed sections of the manifold. This assures an even distribution of fluid throughout.

A suction means for the fluid curtain emitted from inwardly-inclined nozzles 30 is provided by dual exhaust hoods 34 and 36. Exhaust hood 34 is positioned directly over the electric furnace in its normal upright condition, and exhaust hood 36 is positioned in the path of the fluid barrier or curtain emitted from nozzle 30 when the furnace is tilted into its pouring position. A negative pressure means (not shown) is connected to exhaust hoods 34 and 36 to remove the fluid barrier and entrained fumes and dust from the immediate area. These exhaust hoods may be connected to a dust collector or they may be connected to outside atmosphere.

Exhaust hoods 34 and 36 respectively include, for example, dampers 38 and 40 connected by a linkage 42. These elements provide means for alternatively connecting the exhaust hoods to the source of negative pressure in accordance with the position of the electric furnace.

When the furnace is vertical, damper 38 is opened allowing the fumes to be drawn off through exhaust hood 34. When the furnace is tilted for pouring, damper 40 is opened to draw the fluid curtain through exhaust hood 36.

Figs. 3 and 4 describe another arrangement in which the manifold 12a is reduced in size relative to manifold 12 and is raised to a position slightly below the roof of furnace 10a. Covers 26a and 28a respectively shield pouring spout 22a and slag spout 24a and direct fumes, dust and heat emitted therefrom within the periphery of the manifold. In this form of the invention, apertures through the manifold for the spouts are not required.

A fluid discharge nozzle 30a is provided by means of a continuous annular groove in the top of manifold 12a. This groove is defined by vertically formed walls to direct the curtain emitted therefrom in a generally straight vertical direction.

Exhaust hood 34a is supported by any desired means, as for example, from swivel connector 35 to permit the hood to be rotated clear of the furnace 10a to provide unobstructed access to the furnace, for example, by a crane.

As more clearly shown in the figures, the manifold is laterally spaced from the roof of the furnace.

Figs. 5 and 6 show another form of this invention in which the manifold 12b is located in the vicinity of electrodes 31b which emit the greatest amount of fumes and dust relative to other portions of the furnace. Manifold 12b comprises a continuous circular pipe and is of reduced diameter relative to the other illustrated forms of the invention. Covers 26b and 28b shielding pouring spout 22b and slag spout 24b respectively, are of extended length to direct fumes, dust and heat emitted therefrom within the periphery of the manifold 12b.

The fluid discharge means in manifold 12b comprises a series of somewhat elongated, slot-like openings 30b the walls of which are inwardly inclined in a manner similar to openings 30 in Fig. 1. The resultant fluid curtain, projected from these openings or nozzles 30b, barely encompasses the upper portions of electrodes 31b and is directed within an exhaust hood 34b.

In each of the illustrated forms of this invention, a fluid is supplied under pressure to the manifold. In the device shown in Fig. 1, for example, the fluid is supplied through supply pipe 32 to the manifold 12. Compressed air is a preferable fluid since it is readily available, economical and harmless. It may be desirable, however, to use other fluids in some applications such as various gases or steam or combinations thereof. Steam or water vapor, for example, provides a means of cooling and washing the heated fume bearing air emitted from the furnace.

In each of these illustrated forms of this invention, the fluid discharged from the manifold forms a barrier or curtain surrounding the portions of the furnace which emit fumes, dust and heat to contaminate the atmosphere in its immediate vicinity. This curtain or barrier isolates this contaminated portion of the atmosphere and is directed into the exhaust means which collects the fluid curtain and entrained matter and carries it away. A workman operating and tending this furnace accordingly enjoys the luxury of working in a relatively cool and uncontaminated atmosphere while his operating tasks are not obstructed.

It should here be noted that although some illustrated embodiments of this invention, as in Figs. 1 and 5, have been shown with inwardly-inclined nozzles and others, as in Fig. 3, with straight vertically extending nozzles, in any of the forms of the invention, it would be equally possible to use either inclined or straight nozzles when desired.

Obviously, many modifications and variations of the present invention are possible in the light of the above teachings. It is, therefore, to be understood that within the scope of the appended claims the invention may be practiced otherwise than as specifically described.

What is claimed is:

1. A heat treatment system comprising an electric furnace and a barrier-forming means for reducing atmospheric pollution by said furnace, said barrier-forming means having a manifold surrounding and spaced laterally from the upper portion of said furnace, gas supply structure connected to deliver gas under pressure to the manifold, nozzle means on said manifold connected to upwardly project a laterally unenclosed circumferential curtain of said gas to the space above the top of said furnace to encompass the smoke and fumes emitted there, the manifold having depending skirt elements about lower furnace portions that also emit polluting materials, said elements providing communication between said lower furnace portions and the lateral space between the manifold and furnace to guide the last-mentioned polluting materials upwardly to the zone within the curtain, and a suction-operated exhaust hood at the upper end of said curtain for receiving and exhausting the projected gas as well as the smoke and fumes entrained therewith.

2. The combination of claim 1 in which the furnace is mounted for shifting when in use, the manifold and nozzle means are fixed to the furnace for shifting with it, and the exhaust hood is connected to shift its exhausting location so as to collect the projected fluid and entrained materials when the furnace is shifted as well as when it is not.

3. The combination of claim 2 in which the furnace is tiltably mounted and the exhaust hood is pivotally mounted for swivelling between a first position where it collects the projected fluid and entrained materials when the furnace is tilted, and the second position where it collects the fluid and entrained materials when the furnace is not tilted.

4. The combination of claim 1 in which the furnace has a pouring spout and a slag spout and the depending skirt elements are positioned immediately above said spouts.

5. The combination of claim 1 including tilting means connected to tilt the furnace between first and second operating positions, the exhaust hood being divided into two sections, one section positioned to receive and exhaust the projected fluid and entrained materials when the furnace is in the first operating position, and the other hood section being positioned to receive and exhaust the projected fluid and entrained materials when the furnace is in the second operating position.

References Cited in the file of this patent

UNITED STATES PATENTS

| | | |
|---|---|---|
| 1,024,999 | Mackie et al. | Apr. 30, 1912 |
| 1,036,499 | Lamb | Aug. 20, 1912 |
| 1,194,373 | Fralick | Aug. 15, 1916 |
| 1,911,394 | Ritter | May 30, 1933 |
| 1,921,763 | MacDougall | Aug. 8, 1933 |
| 2,269,645 | Browning | Jan. 13, 1942 |

FOREIGN PATENTS

| | | |
|---|---|---|
| 735,319 | France | Aug. 23, 1932 |
| 10,835 | Great Britain | 1908 |